（12）United States Patent
Liang et al.

(10) Patent No.: US 11,888,177 B2
(45) Date of Patent: Jan. 30, 2024

(54) BATTERY, POWER CONSUMPTION DEVICE, AND METHOD AND DEVICE FOR PRODUCING BATTERY

(71) Applicant: JIANGSU CONTEMPORARY AMPEREX TECHNOLOGY LIMITED, Jiangsu (CN)

(72) Inventors: Chengdu Liang, Jiangsu (CN); Langchao Hu, Jiangsu (CN); Xiaoteng Huang, Jiangsu (CN); Jiarong Hong, Jiangsu (CN); Haiqi Yang, Jiangsu (CN); Wenli Wang, Jiangsu (CN)

(73) Assignee: JIANGSU CONTEMPORARY AMPEREX TECHNOLOGY LIMITED, Jiangsu (CN)

( * ) Notice: Subject to any disclaimer, the term of this patent is extended or adjusted under 35 U.S.C. 154(b) by 579 days.

(21) Appl. No.: 17/139,735

(22) Filed: Dec. 31, 2020

(65) Prior Publication Data
US 2022/0123431 A1    Apr. 21, 2022

Related U.S. Application Data

(63) Continuation of application No. PCT/CN2020/121994, filed on Oct. 19, 2020.

(51) Int. Cl.
*H01M 50/383* (2021.01)
*H01M 10/613* (2014.01)
(Continued)

(52) U.S. Cl.
CPC ............. *H01M 50/383* (2021.01); *A62C 3/16* (2013.01); *H01M 10/613* (2015.04);
(Continued)

(58) Field of Classification Search
CPC ............. H01M 50/383; H01M 10/613; H01M 10/6567; H01M 2200/10; H01M 2200/20;
(Continued)

(56) References Cited

U.S. PATENT DOCUMENTS

| 2013/0244062 A1* | 9/2013 | Teramoto | ............. H01M 10/425 |
| | | | 429/7 |
| 2020/0212526 A1 | 7/2020 | Wu et al. | |

FOREIGN PATENT DOCUMENTS

| CN | 201303012 Y | 9/2009 |
| CN | 105070860 A | 11/2015 |

(Continued)

OTHER PUBLICATIONS

Extended European Search Report dated Mar. 18, 2022 received in European Patent Application No. EP 20828247.5.
Decision to Grant a Patent dated Sep. 4, 2023 received in Japanese Patent Application No. JP 2023-503004.

*Primary Examiner* — Muhammad S Siddiquee
(74) *Attorney, Agent, or Firm* — Scully, Scott, Murphy & Presser, P.C.

(57) ABSTRACT

Embodiments of the present application provide a battery, a power consumption device, and a method and device for producing a battery. The battery includes: a battery cell, the battery cell including a pressure relief mechanism configured to be actuated when an internal pressure or temperature of the battery cell reaches a threshold, to relieve the internal pressure; a fire-fighting pipeline configured to accommodate a fire-fighting medium and discharge the fire-fighting medium toward the battery cell when the pressure relief mechanism is actuated; and an accommodating part configured to accommodate the fire-fighting medium discharged from the fire-fighting pipeline to lower a temperature of the (Continued)

battery cell. According to technical solutions of the embodiments of the present application, the safety of the battery could be enhanced.

17 Claims, 8 Drawing Sheets

(51) Int. Cl.
  *H01M 10/6567* (2014.01)
  *A62C 3/16* (2006.01)
(52) U.S. Cl.
  CPC .... *H01M 10/6567* (2015.04); *H01M 2200/10* (2013.01); *H01M 2200/20* (2013.01)
(58) Field of Classification Search
  CPC .. H01M 50/375; H01M 50/609; H01M 10/42; H01M 10/625; A62C 3/16; A62C 35/10; Y02E 60/10
  See application file for complete search history.

(56) References Cited

FOREIGN PATENT DOCUMENTS

| | | |
|---|---|---|
| CN | 207233825 U | 4/2018 |
| CN | 207474504 U | 6/2018 |
| CN | 207886552 U | 9/2018 |
| CN | 208848942 U | 5/2019 |
| CN | 110034256 A | 7/2019 |
| CN | 209071461 U | 7/2019 |
| CN | 110148694 A | 8/2019 |
| CN | 209592146 U | 11/2019 |
| CN | 110660945 A | 1/2020 |
| CN | 111247686 A | 6/2020 |
| CN | 210723159 U | 6/2020 |
| CN | 111509163 A | 8/2020 |
| CN | 211376746 U | 8/2020 |
| JP | H11-273640 A | 10/1999 |
| JP | 2017123298 A | 7/2017 |
| WO | 2013017204 A1 | 2/2013 |

* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2020/121994, filed on Oct. 19, 2020, the disclosure of which is hereby incorporated by reference in its entirety.

TECHNICAL FIELD

Embodiments of the present application relate to the field of energy storage devices, and in particular to a battery, a power consumption device, and a method and device for producing a battery.

BACKGROUND

Energy saving and emission reduction are the key to the sustainable development of the automotive industry. In this case, electric vehicles have become an important part of the sustainable development of the automotive industry due to their advantages of energy saving and environmental-friendliness. For the electric vehicles, the battery technology is an important factor for their development.

In the development of the battery technology, in addition to improving the performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

Embodiments of the present application provide a battery, a power consumption device, and a method and device for producing a battery, which could enhance the safety of the battery.

In a first aspect, a battery is provided, including: a battery cell, the battery cell including a pressure relief mechanism configured to be actuated when an internal pressure or temperature of the battery cell reaches a threshold, to relieve the internal pressure; a fire-fighting pipeline configured to accommodate a fire-fighting medium and discharge the fire-fighting medium toward the battery cell when the pressure relief mechanism is actuated; and an accommodating part configured to accommodate the fire-fighting medium discharged from the fire-fighting pipeline to lower a temperature of the battery cell.

In an embodiment of the present application, the battery includes the accommodating part configured to accommodate the fire-fighting medium. In this way, when the pressure relief mechanism is actuated and the fire-fighting pipeline discharges the fire-fighting medium toward the battery cell where thermal runaway occurs, the fire-fighting medium may not only flow into the battery cell where thermal runaway occurs, a part of the fire-fighting medium may also be stored in the accommodating part, so that the fire-fighting medium discharged from the fire-fighting pipeline may be fully and effectively utilized, which avoids the problem of wasting the fire-fighting medium, so as to rapidly lower the temperature of the battery cell and reduce the risk caused by the abnormality of the battery cell as soon as possible, reduce the possibility of explosion of the battery, and enhance the safety of the battery. Furthermore, if thermal runaway occurs in the battery cell at a later time, the fire-fighting medium stored in the accommodating part may continue to lower the temperature of the battery cell where thermal runaway occurs, which could further enhance the safety of the battery.

In some embodiments, the pressure relief mechanism is disposed on a first wall of the battery cell, the accommodating part includes a first accommodating part, the first accommodating part is attached to a second wall of the battery cell, the second wall is perpendicular to the first wall, and the first accommodating part is configured to collect the fire-fighting medium diffused from the first wall In this technical solution, when thermal runaway occurs in the battery cell, a part of the fire-fighting medium discharged from the fire-fighting pipeline may flow into the battery cell, and another part of the fire-fighting medium diffused from the first wall may be collected in the first accommodating part, so that the fire-fighting medium collected in the first accommodating part may continuously lower the temperature of the battery cell.

In some embodiments, the first accommodating part includes a first plate, a second plate and at least two baffles, the second plate intersects the first plate, the first plate intersects the second wall, and the at least two baffles intersect the first plate and the second plate.

In some embodiments, the first plate is parallel to the first wall, the second plate is parallel to the second wall, and the at least two baffles are perpendicular to the first plate and the second plate.

In some embodiments, the first plate is a bottom plate of a case of the battery.

In some embodiments, the second plate is a side plate of a case of the battery or a beam of a case.

In the foregoing technical solution, the first accommodating part reuses the case, the side plate, or the beam of the battery, which could save the production cost of the battery.

In some embodiments, two baffles of the at least two baffles, the first plate, the second plate, and the second wall(s) of N battery cell(s) are configured to form an accommodating space for accommodating the fire-fighting medium, and the accommodating space has an opening toward the first wall, and N is a positive integer.

In some embodiments, N is equal to 1, 2 or 3.

When N is greater than 1, the fire-fighting medium may not only lower the temperature of the battery cell where thermal runaway occurs, but also lower a temperature of a battery cell adjacent to the battery cell, thus blocking the thermal diffusion.

In some embodiments, the at least two baffles have a same length in a first direction, and the first direction is a direction perpendicular to the first wall.

In some embodiments, the first plate and a third wall of the battery cell lie in a same plane, and the third wall is parallel to the first wall.

The first plate and the third wall lie in the same plane, so that the accommodating space formed by the first accommodating part and the second wall may be maximized, and thus more fire-fighting media may be stored.

In some embodiments, the first plate is located between the first wall and a third wall of the battery cell, and the third wall is parallel to the first wall.

In some embodiments, one end of the second plate close to the third wall is flush with the third wall.

In some embodiments, other baffles of the at least two baffles except two baffles located at both ends of the second plate are embedded between two adjacent battery cells.

By embedding the baffle between two adjacent battery cells, the connection stability between the first accommodating part and the second wall can be improved.

In some embodiments, the first plate is attached to the second wall by a connecting member.

In some embodiments, the first accommodating part includes a connecting plate, the connecting plate extends along a first direction at one end of the first plate connected to the second wall, and the connecting plate is attached to the second wall by the connecting member, and the first direction is a direction perpendicular to the first wall.

By providing the connecting plate, the first accommodating part and the second wall have a larger connecting area, and thus the connection strength and heat conduction area can be increased.

In some embodiments, the connecting member is a thermally conductive adhesive.

The connecting member is set as a thermally conductive adhesive, so that the thermally conductive adhesive may transfer heat to the battery cell.

In some embodiments, the pressure relief mechanism is disposed on a first wall of the battery cell, the accommodating part includes a second accommodating part disposed on the first wall, the pressure relief mechanism is disposed on a bottom wall of the second accommodating part, and the second accommodating part is configured to collect the fire-fighting medium flowing into the battery cell when the pressure relief mechanism is actuated.

By providing the second accommodating part on the first wall of the battery cell, when thermal runaway occurs in the battery cell, the fire-fighting medium may not only flow into the battery cell, a part of the fire-fighting medium may also be stored in the second accommodating part, so that more fire-fighting media may be used for cooling and lowering the temperature of the battery cell. Further, when a flow rate of the fire-fighting medium is small, the fire-fighting medium may more easily be stored in the second accommodating part and then flow into the battery cell, so as to cool and lower the temperature of the battery cell where thermal runaway occurs; and when a flow rate of fire-fighting medium is large, the fire-fighting medium may not only lower the temperature of the battery cell where thermal runaway occurs as soon as possible, but also be stored in the second accommodating part. In this case, the fire-fighting medium may also lower the temperature of other battery cells, which could further enhance the safety of the battery.

In some embodiments, an opening of the second accommodating part faces toward an exterior of the battery cell, and an area of the opening of the second accommodating part is larger than an area of a region where the pressure relief mechanism is located.

In some embodiments, an area of an opening of the second accommodating part is larger than or equal to an area of a surface of the bottom wall of the second accommodating part toward an exterior of the battery cell.

The larger the area of the opening of the second accommodating part is, the larger the area for the second accommodating part to collect the fire-fighting medium is, thereby improving the efficiency of collecting the fire-fighting medium by the second accommodating part.

In some embodiments, a thickness of the bottom wall of the second accommodating part is uniform.

In some embodiments, a surface of the bottom wall of the second accommodating part toward an exterior of the battery cell is an inclined surface inclined toward an interior of the second accommodating part from the periphery to the center.

In some embodiments, a surface of the first wall close to an interior of the battery cell includes a first region and a second region, the first region is a region corresponding to the second accommodating part, the second region is a region on the surface of the first wall close to the interior of the battery cell except the first region, and the first region and the second region lie in a same plane.

In some embodiments, a surface of the first wall close to an interior of the battery cell includes a first region and a second region, the first region is a region corresponding to the second accommodating part, the second region is a region on the surface of the first wall close to the interior of the battery cell except the first region, and a plane where the first region is located is closer to the interior of the battery cell than a plane where the second region is located.

In this way, the fire-fighting medium may better flow into the second accommodating part.

In some embodiments, the bottom wall of the second accommodating part is provided with a partition rib, and the partition rib divides the bottom wall of the second accommodating part into at least two regions.

By providing the partition rib, the strength of the second accommodating part can be increased.

In some embodiments, the pressure relief mechanism is located in one region of the at least two regions.

In some embodiments, the bottom wall of the second accommodating part is provided with a through hole, and the pressure relief mechanism covers the through hole.

In some embodiments, the battery further includes: a protective sheet configured to protect the pressure relief mechanism, located at one side of the pressure relief mechanism toward an exterior of the battery cell, and covering the pressure relief mechanism.

By providing the protective sheet, foreign matters can be prevented from contacting the pressure relief mechanism, so that the foreign matters will not affect the pressure when the pressure relief mechanism is actuated, and thus the pressure relief mechanism can be protected.

In some embodiments, a surface of the bottom wall of the second accommodating part toward the exterior of the battery cell is provided with a protrusion extending toward the exterior of the battery cell in a surrounding region of the pressure relief mechanism, and the protective sheet is fixed on the protrusion to cover the pressure relief mechanism. The protrusion can strengthen the strength around the pressure relief mechanism.

In some embodiments, a height of the protrusion protruding relative to the surface of the bottom wall of the second accommodating part toward the exterior of the battery cell is smaller than a depth of the second accommodating part.

In a second aspect, a power consumption device is provided, including: the battery of the first aspect.

In some embodiments, the power consumption device is a vehicle, a ship or a spacecraft.

In a third aspect, a method for producing a battery is provided, including providing a battery cell, the battery cell including a pressure relief mechanism configured to be actuated when an internal pressure or temperature of the battery cell reaches a threshold, to relieve the internal pressure; providing a fire-fighting pipeline, the fire-fighting pipeline being configured to accommodate a fire-fighting medium and discharge the fire-fighting medium toward the battery cell when the pressure relief mechanism is actuated; and providing an accommodating part, the accommodating part being configured to accommodate the fire-fighting medium discharged from the fire-fighting pipeline to lower a temperature of the battery cell.

In some embodiments, the pressure relief mechanism is disposed on a first wall of the battery cell, the accommodating part includes a first accommodating part, the first accommodating part is attached to a second wall of the battery cell, the second wall is perpendicular to the first wall, and the first accommodating part is configured to collect the fire-fighting medium diffused from the first wall.

In some embodiments, the first accommodating part includes a first plate, a second plate and at least two baffles, the second plate intersects the first plate, the first plate intersects the second wall, and the at least two baffles intersect the first plate and the second plate.

In some embodiments, the accommodating part includes a second accommodating part disposed on the first wall, the pressure relief mechanism is disposed on a bottom wall of the second accommodating part, and the second accommodating part is configured to collect the fire-fighting medium flowing into the battery cell when the pressure relief mechanism is actuated.

In some embodiments, an opening of the second accommodating part faces toward an exterior of the battery cell, and an area of the opening of the second accommodating part is larger than an area of a region where the pressure relief mechanism is located.

In a fourth aspect, a device for producing a battery is provided, including a module for executing the method provided in the foregoing third aspect.

BRIEF DESCRIPTION OF THE DRAWINGS

The drawings described herein are used to provide a further understanding of the present application and form a part of the present application. The illustrative embodiments of the present application and the description thereof are used to explain the present application and are not intended to limit the present application. In the drawings.

DESCRIPTION OF EMBODIMENTS

Figure 1:
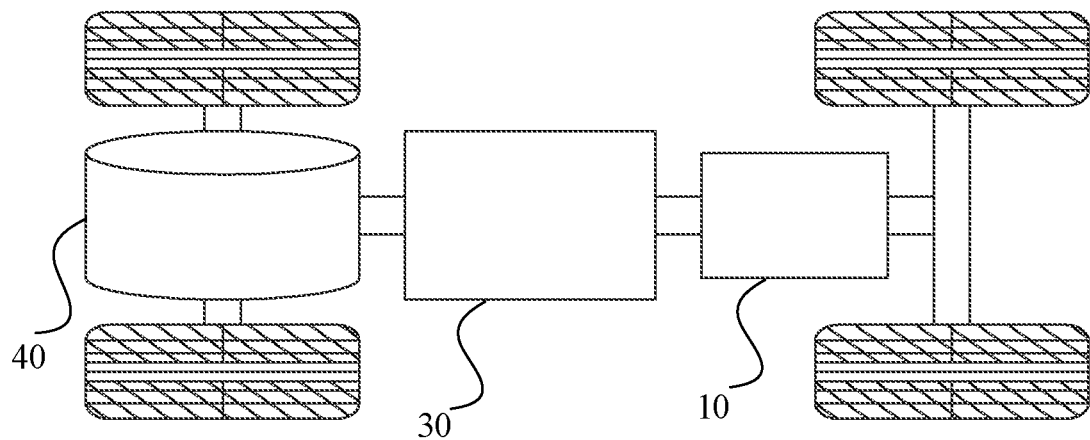
FIG. 1 is a schematic diagram of a vehicle according to an embodiment of the present application.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the present application, "a plurality of" means two or more (including two), similarly, "a plurality of groups" means two or more groups (including two groups), and "a plurality of sheets" means two or more sheets (including two sheets).

In an embodiment of the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiment of the present application. The battery cells may be cylindrical, flat, cuboid or in another shape, which is not limited by the embodiment of the present application. The battery cells are generally divided into three types according to the way of packaging: cylindrical battery cells, prismatic battery cells and pouch battery cells, which is not limited by the embodiment of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a case for enclosing one or more battery cells. The case can prevent a liquid or other foreign matters from affecting the charging or discharging of the battery cell.

The battery cell may include an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. Taking a lithium-ion battery as an example, the material of the positive electrode current collector may be aluminum, and the positive active material may be lithium cobalt oxides, lithium iron phosphate, ternary lithium or lithium manganate, etc. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative active material may be graphite, carbon or silicon, etc. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may have a winding structure or a laminated structure, and the embodiments of the present application are not limited thereto.

With the development of the battery technology, it is necessary to consider many design factors, such as energy density, cycle life, discharge capacity, C-rate and other performance parameters. In addition, the safety of the battery should also be considered.

With respect to battery cells, the main safety hazards come from the charging and discharging processes, and a suitable environmental temperature design is also required. In order to effectively avoid unnecessary losses, at least triple protection measures are generally taken for the battery cells. Specifically, the protection measures include at least a switching element, a properly selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated when an internal pressure or temperature of the battery cell reaches a predetermined threshold, to relieve the internal pressure or temperature. The threshold design is different according to different design requirements. The threshold may depend on the material of one or more of the positive electrode sheet, the negative electrode sheet, the electrolytic solution and the isolation film in the battery cell. The pressure relief mechanism may take the form of an explosion-proof valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for relieving the internal pressure or temperature.

The "actuation" mentioned in the present application means that the pressure relief mechanism acts or is activated to a certain state, such that the internal pressure and temperature of the battery cell can be relieved. The action generated by the pressure relief mechanism may include but be not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure in the battery cell can be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the isolation film, high-temperature and high-pressure gases generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge emissions to the outside of the battery cell. The high-temperature and high-pressure emissions are discharged along a direction of the pressure relief mechanism provided in the battery cell, and more specifically, may be discharged along a direction of a region where the pressure relief mechanism is actuated. The strength and destructive power of such emissions may be great, or may even be enough to break through one or more structures along this direction, causing further safety problems. In addition, after thermal runaway occurs inside the battery cell, high pressure and high heat inside the battery cell may continue to be generated, resulting in continuous potential safety hazards.

In order to solve the foregoing problems, a fire-fighting system may be disposed inside a case of a battery, and a fire-fighting pipeline of the fire-fighting system is disposed above a wall of a battery cell provided with a pressure relief mechanism. When the pressure relief mechanism is actuated, the fire-fighting pipeline discharges a fire-fighting medium, thereby lowering a temperature of the emissions discharged from the pressure relief mechanism and reducing the risk resulting from the emissions; and the fire-fighting medium may further flow through the actuated pressure relief mechanism to the interior of the battery cell, thereby further lowering a temperature of the battery cell and enhancing the safety of the battery. For example, the emissions discharged from the battery cell when the pressure relief mechanism is actuated may be used to damage the fire-fighting pipeline, so that the fire-fighting medium in the fire-fighting pipeline is discharged.

The fire-fighting pipeline in an embodiment of the present application is configured to accommodate a fire-fighting medium, the fire-fighting medium here may be a fluid, and the fluid may be a liquid or gas. Optionally, the fire-fighting medium can flow in a circulating manner to achieve better temperature adjustment effects. Optionally, the fire-fighting medium may be water, a mixture of water and ethylene glycol, or air, etc. or the fire-fighting medium may be at least one of liquid nitrogen, liquid argon or liquid carbon dioxide.

As an example, the battery may include a control system, and the control system may control the fire-fighting pipeline to discharge the fire-fighting medium when the pressure relief mechanism is actuated.

As another example, when the pressure relief mechanism is actuated, the emissions discharged from the battery cell may pass through and damage the fire-fighting pipeline, so that the fire-fighting medium discharges from the fire-fighting pipeline. In an embodiment of the present application, the case where the emissions pass through and damage the fire-fighting pipeline is taken as an example for description, but the present application is not limited thereto.

In the case where the pressure relief mechanism does not damage the fire-fighting pipeline, the fire-fighting pipeline may not accommodate any substance, but in the case where the pressure relief mechanism is actuated, the fire-fighting medium may be accommodated in the fire-fighting pipeline, for example, the fire-fighting medium may be controlled to enter the fire-fighting pipeline by switching on or off a valve. Or, in the case where the pressure relief mechanism is not damaged, the fire-fighting medium may always be accommodated in the fire-fighting pipeline.

The fire-fighting medium may also be used for adjusting the temperature of the battery cell. Temperature adjustment means heating or cooling a plurality of battery cells. In the case of cooling or lowering the temperature of the battery cells, the fire-fighting pipeline is configured to accommodate a cooling fluid to lower the temperature of the plurality of battery cells. In this case, the fire-fighting pipeline may also be called a cooling component, a cooling system or a cooling pipeline, etc. The fire-fighting medium accommodated by the fire-fighting pipeline may also be called a cooling medium or a cooling fluid, and more specifically, may be called a cooling liquid or a cooling gas.

However, when the pressure relief mechanism is actuated due to the occurrence of thermal runaway inside the battery cell, a part of the fire-fighting medium discharged from the fire-fighting pipeline may flow to the exterior of the battery cell where thermal runaway occurs, which makes the fire-fighting medium unable to be fully utilized and may cause the problem that the temperature of the battery cell where thermal runaway occurs cannot be lowered quickly. In view of this, an embodiment of the present application provides a battery, which can solve the foregoing problems.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing devices, but also applicable to all devices using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
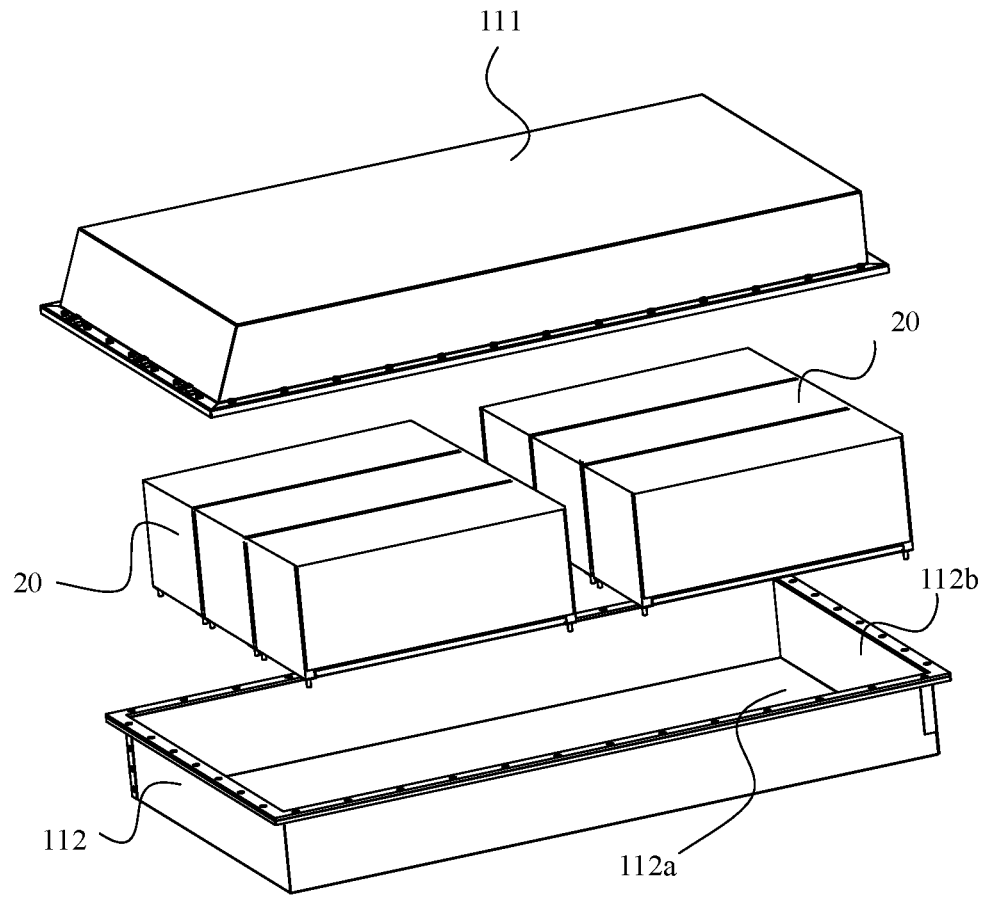
FIG. 2 is a schematic structural diagram of a battery according to an embodiment of the present application.

For example, as shown in FIG. 2, which is a schematic structural diagram of a battery 10 according to an embodiment of the present application, the battery 10 may include a plurality of battery cells 20. The battery 10 may further include a case (or a covering) with the interior thereof being a hollow structure, and the plurality of battery cells 20 are accommodated in the case. As shown in FIG. 2, the case may include two portions, which are respectively referred to as a first portion 111 and a second portion 112, respectively, and the first portion 111 and the second portion 112 are fastened together. The shapes of the first portion 111 and the second portion 112 may be determined according to the shape of the combined plurality of battery cells 20, and the first portion 111 and the second portion 112 may each have an opening. For example, the first portion 111 and the second portion 112 each may be a hollow cuboid and each have only one surface with an opening, and the opening of the first portion 111 is arranged opposite to the opening of the second portion 112. The first portion 111 and the second portion 112 are fastened to each other to form a case with a closed chamber. The case may include a bottom plate 112a, a side plate 112b and a beam. The plurality of battery cells 20 are combined in parallel connection or series connection or series-parallel connection and are then placed in the case formed by fastening the first portion 111 to the second portion 112.

Optionally, the battery 10 may also include other structures, which will not be described in detail herein. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case. Optionally, the electrically conductive mechanism may also belong to the bus component.

Figure 3:
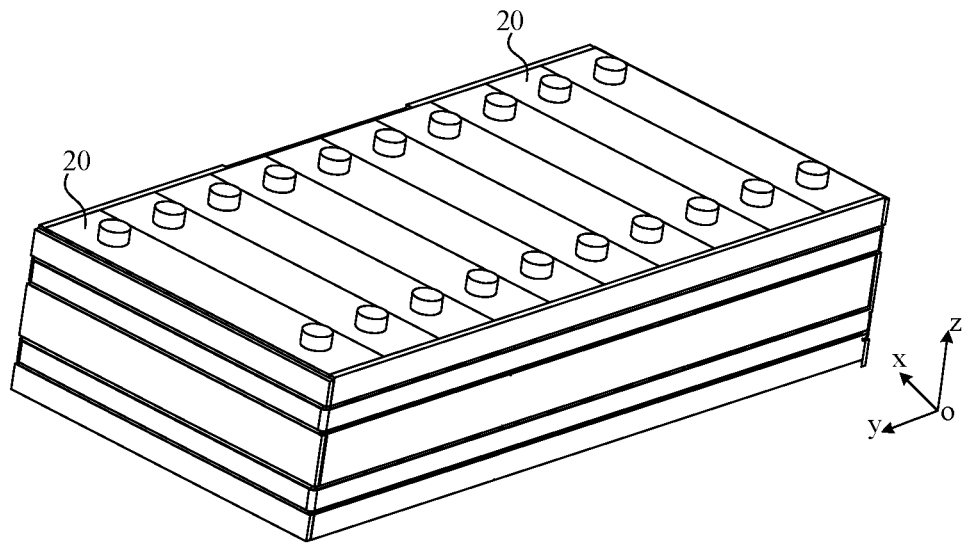
FIG. 3 is a schematic structural diagram of a battery module according to an embodiment of the present application.
Figure 4:
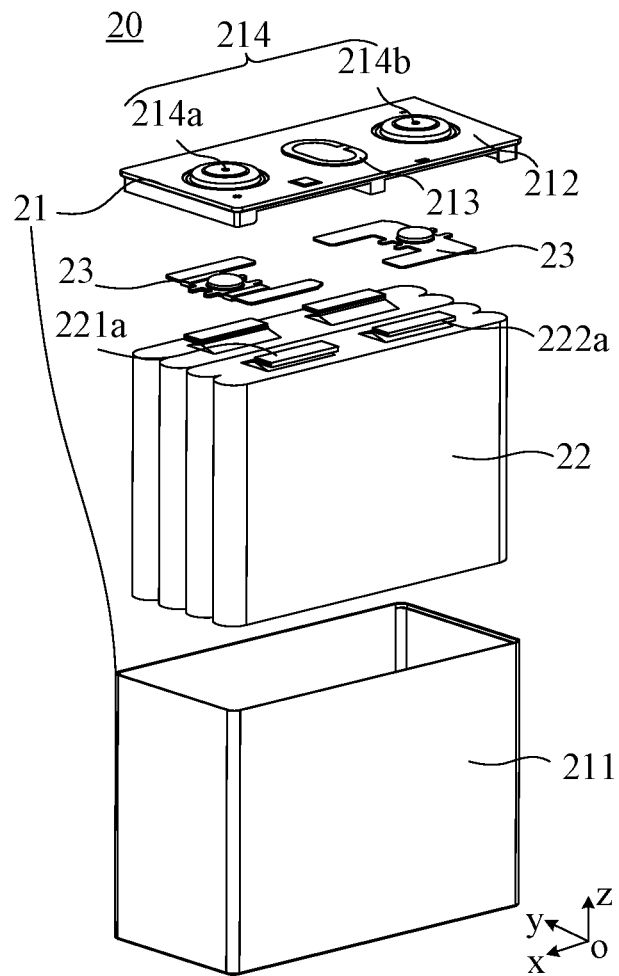
FIG. 4 is an exploded view of a battery cell according to an embodiment of the present application.

According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. For example, FIG. 3 shows an example of a battery module. The battery may include a plurality of battery modules, and these battery modules may be connected in series, in parallel or in series and parallel. FIG. 4 is an exploded view of a battery cell according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one surface of the housing 211 has an opening such that one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23 also called a current collecting member 23, which is located between the cover plate 212 and the electrode assembly 22 and configured to electrically connect the electrode assembly 22 to the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of one or more electrode assemblies 22 is connected to one electrode terminal via one connecting member 23, and the second electrode tab 222a of one or more electrode assemblies 22 is connected to the other electrode terminal via the other connecting member 23. For example, the positive electrode terminal 214a is connected to the positive electrode tab via one connecting member 23, and the negative electrode terminal 214b is connected to the negative electrode tab via the other connecting member 23.

In this battery cell 20, according to actual use requirements, there may be a single or a plurality of electrode assemblies 22. As shown in FIG. 4, there are four separate electrode assemblies 22 in the battery cell 20.

A pressure relief mechanism 213 may also be provided on the battery cell 20. The pressure relief mechanism is configured to be actuated when an internal pressure or temperature of the battery cell 20 reaches a threshold, to relieve the internal pressure or temperature.

The pressure relief mechanism 213 may have various possible pressure relief structures, which is not limited by the embodiment of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Figure 5:
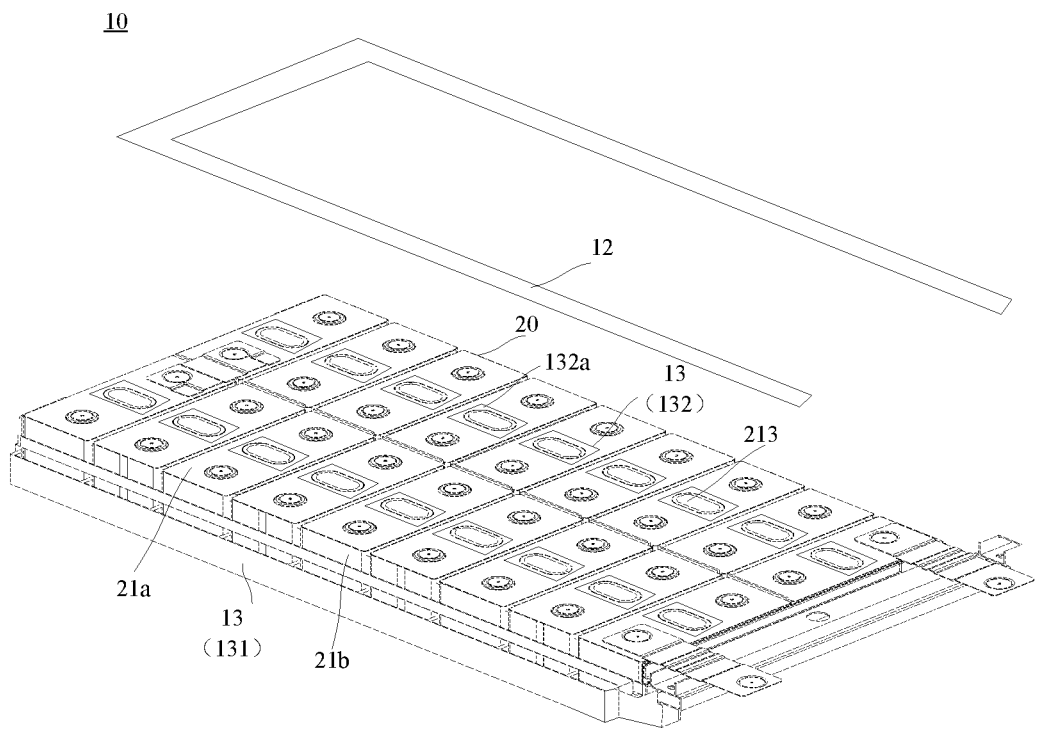
FIG. 5 is a schematic structural diagram of a battery according to an embodiment of the present application.

FIG. 5 is a schematic diagram of a battery 10 according to an embodiment of the present application. As shown in FIG. 5, the battery 10 may include a battery cell 20, a fire-fighting pipeline 12 and an accommodating part 13.

The battery cell 20 includes a pressure relief mechanism 213, and the pressure relief mechanism 213 is configured to be actuated when an internal pressure or temperature of the battery cell 20 reaches a threshold, to relieve the internal pressure. The fire-fighting pipeline 12 is configured to accommodate a fire-fighting medium, and discharge the fire-fighting medium toward the battery cell 20 when the pressure relief mechanism 213 is actuated. The accommodating part 13 is configured to accommodate the fire-fighting medium discharged from the fire-fighting pipeline 12 to lower a temperature of the battery cell 20.

Therefore, in an embodiment of the present application, the battery 10 includes the accommodating part 13 configured to accommodate the fire-fighting medium. In this way, when the pressure relief mechanism 213 is actuated and the fire-fighting pipeline 12 discharges the fire-fighting medium toward the battery cell 20 where thermal runaway occurs, the fire-fighting medium may not only flow into the battery cell 20 where thermal runaway occurs, a part of the fire-fighting medium may also be stored in the accommodating part 13, so that the fire-fighting medium discharged from the fire-fighting pipeline 12 may be fully and effectively utilized, which avoids the problem of wasting the fire-fighting medium, so as to rapidly lower the temperature of the battery cell 20 and reduce the risk caused by the abnormality of the battery cell 20 as soon as possible, reduce the possibility of explosion of the battery 10, and enhance the safety of the battery 10.

Furthermore, if thermal runaway occurs in the battery cell at a later time, the fire-fighting medium stored in the accommodating part may continue to lower the temperature of the battery cell where thermal runaway occurs, which could further enhance the safety of the battery.

Optionally, the fire-fighting pipeline 12 may continuously discharge the fire-fighting medium toward the battery cell 20 when the pressure relief mechanism 213 is actuated, or the fire-fighting pipeline 12 may intermittently discharge the fire-fighting medium toward the battery cells 20 when the pressure relief mechanism 213 is actuated.

The fire-fighting pipeline 12 may be set to be any shape according to practical application. For example, considering space utilization and convenience for installation, the fire-fighting pipeline 12 may be set as a flat pipeline, or may be set to be other shapes, such as a cylindrical pipeline, a straight pipeline, a U-shaped pipeline and an S-shaped pipeline.

Optionally, after the pressure relief mechanism 213 is actuated, the accommodating part 13 may directly use the accommodating fire-fighting medium to lower the temperature of the battery cell 20 where thermal runaway occurs, via a wall where the pressure relief mechanism is located; and/or, the accommodating part 13 may first make the accommodating fire-fighting medium flow into the battery cell 20 where thermal runaway occurs, and then lower the temperature of the battery cell 20 where thermal runaway occurs.

The battery 10 shown in FIG. 5 may be the battery 10 in FIGS. 1 and 2. It should be noted that in the embodiment of the present application, same components are denoted by same reference signs, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

Optionally, in an embodiment of the present application, the pressure relief mechanism 213 may be disposed on a first wall 21a of the battery cell 20, the accommodating part 13 includes a first accommodating part 131, the first accommodating part 131 is attached to a second wall 21b of the battery cell 20, the second wall 21b is perpendicular to the first wall 21a, and the first accommodating part 131 is configured to collect the fire-fighting medium diffused from the first wall 21a.

When thermal runaway occurs in the battery cell 20, a part of the fire-fighting medium discharged from the fire-fighting pipeline 12 may flow into the battery cell 20, and another part of the fire-fighting medium diffused from the first wall 21a may be collected in the first accommodating part 131, so that the fire-fighting medium collected in the first accommodating part 131 may continuously lower the temperature of the battery cell 20.

The first wall 21a may be any one wall of the battery cell 20. As an example, as shown in FIG. 5, the first wall 21a is the uppermost wall of the battery cell 20. The pressure relief mechanism 213 may be a portion of the first wall 21a or is split from the first wall 21a and fixed to the first wall 21a by means of welding, for example. When the pressure relief mechanism 213 is a portion of the first wall 21a, for example, the pressure relief mechanism 213 may be formed by providing an indentation on the first wall 21a. In the case where the first wall 21a is the uppermost wall of the battery cell 20, the second wall 21b is a side wall of the battery cell 20.

The first accommodating part 131 may include a first plate 133, a second plate 134 and at least two baffles 135, where the second plate 134 intersects the first plate 133, the first plate 133 intersects the second wall 21b, and the at least two baffles 135 intersect the first plate 133 and the second plate 134.

Two baffles of the at least two baffles 135, the first plate 133, the second plate 134, and the second wall(s) 21b of N battery cell(s) 20 may form an accommodating space for accommodating the fire-fighting medium, and the accommodating space has an opening toward the first wall 21a, and N is a positive integer.

The present application does not limit the value of N. Optionally, N may be 1, 2 or 3.

Figure 6:
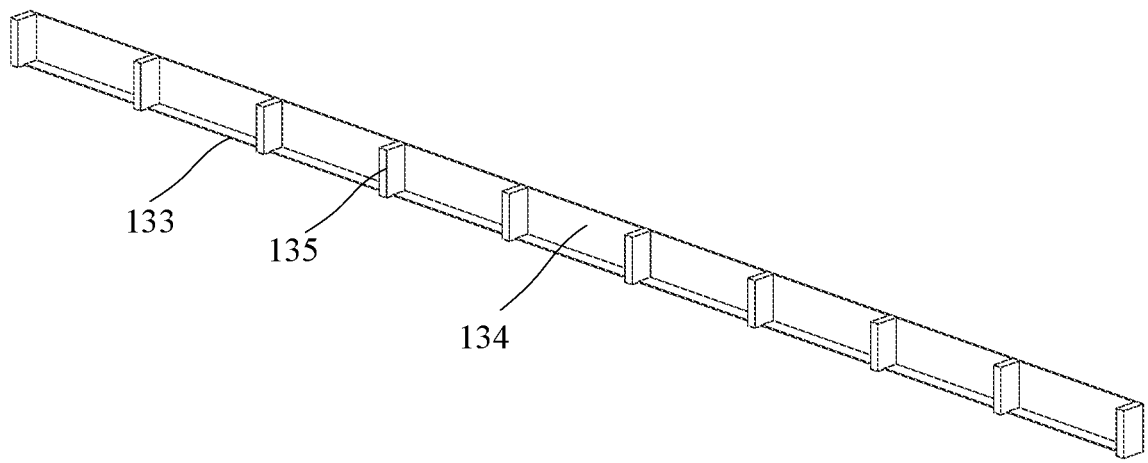
FIGS. 6-9 are schematic structural diagrams of a first accommodating part according to some embodiments of the present application.
Figure 7:
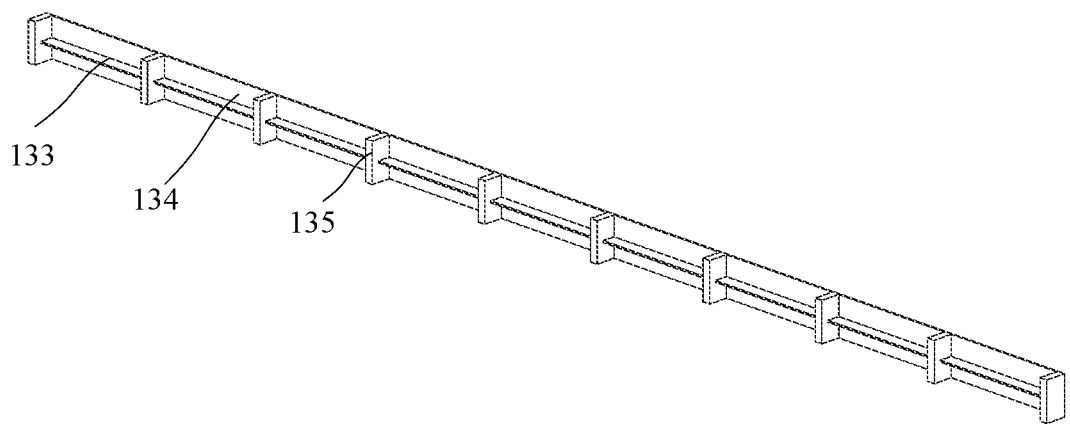

As shown in FIGS. 6 and 7, when N is equal to 1, that is, the second wall 21b of each battery cell 20 may form an accommodating space with two baffles of the at least two baffles 135, the first plate 133 and the second plate 134. In this case, the number of baffles 135 may be one more than the number of battery cells 20. When N is greater than 1, a plurality of battery cells 20 share one first accommodating part 131. Taking FIG. 8 and FIG. 9 as an example, the second walls 21b of two battery cells 20 and the first accommodating part 131 form an accommodating space. When the plurality of battery cells 20 share one first accommodating part 131, if thermally runaway occurs in one of the battery cells 20, a region of the fire-fighting pipeline corresponding to this battery cell 20 is fractured to release a fire-fighting medium, one part of the fire-fighting medium flows into the battery cell 20 through the pressure relief mechanism 213, and the other part thereof flows out from the first wall 21a and is stored in the first accommodating part 131; and this part of the fire-fighting medium can not only lower a temperature of the battery cell 20 where thermally runaway occurs, but also lower a temperature of battery cells 20 adjacent to the battery cell 20, so as to further block the heat diffusion.

The first accommodating part 131 may be in any shape. For example, the first accommodating part 131 may be rectangular as shown in FIGS. 6-9, or may be circular or trapezoidal. For another example, the first accommodating part 131 may be in an irregular shape. In addition, the first accommodating part 131 may also be an integral structure.

When the first accommodating part 131 is rectangular as shown in FIGS. 6-9, the first plate 133 may be parallel to the first wall 21a, and the second plate 134 may be parallel to the second wall 21b, that is, the first plate 133 is perpendicular to the second plate 134, and the at least two baffles 135 may be perpendicular to the first plate 133 and the second plate 134. In other words, the first plate 133 may be a bottom plate of the first accommodating part 131, and the second plate 134 may be a side plate of the first accommodating part 131.

Optionally, the second plate 134 may be a side plate 112b of a case of the battery 10 or a beam of a case of the battery 10.

Optionally, the first plate 133 may be a bottom plate 112a of a case of the battery 10.

The first accommodating part 131 reuses the case of the battery 10. In this way, the production cost of the battery could be saved.

Alternatively, the first plate 133 and/or the second plate 134 may be newly added plates in the battery 10.

Figure 8:
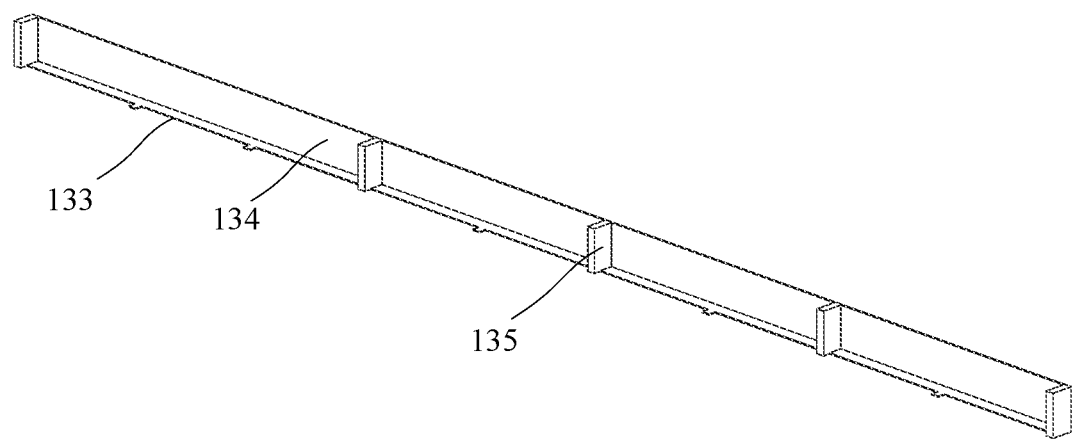

It should be noted that a distance between the first plate 133 and an upper surface of the case of the battery 10 is not limited in the embodiment of the present application. As an example, the first plate 133 may lie in the same plane as a third wall 21c of the battery cell 20, and referring to FIG. 10, the third wall 21c is perpendicular to the second wall 21b, that is, the third wall 21c is parallel to the first wall 21a. In FIGS. 6, 8 and 10, the first plate 133 and the third wall 21c lie in the same plane, in other words, the first plate 133 is closely attached to an upper surface of a case of the first accommodating part 131. It should be noted that in FIGS. 6-9, one end of the at least two baffles 135 close to the third wall 21c lies in the same plane as the third wall 21c.

The first plate 133 and the third wall 21c lie in the same plane. In this way, the accommodating space formed between the first accommodating part 131 and the second wall 21b may be maximized, and thus more fire-fighting media may be accommodated.

Figure 9:
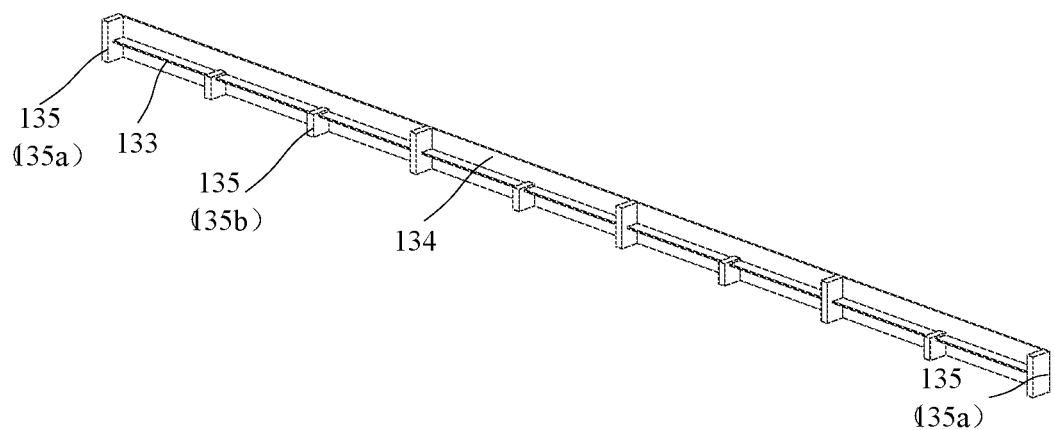
Figure 10:
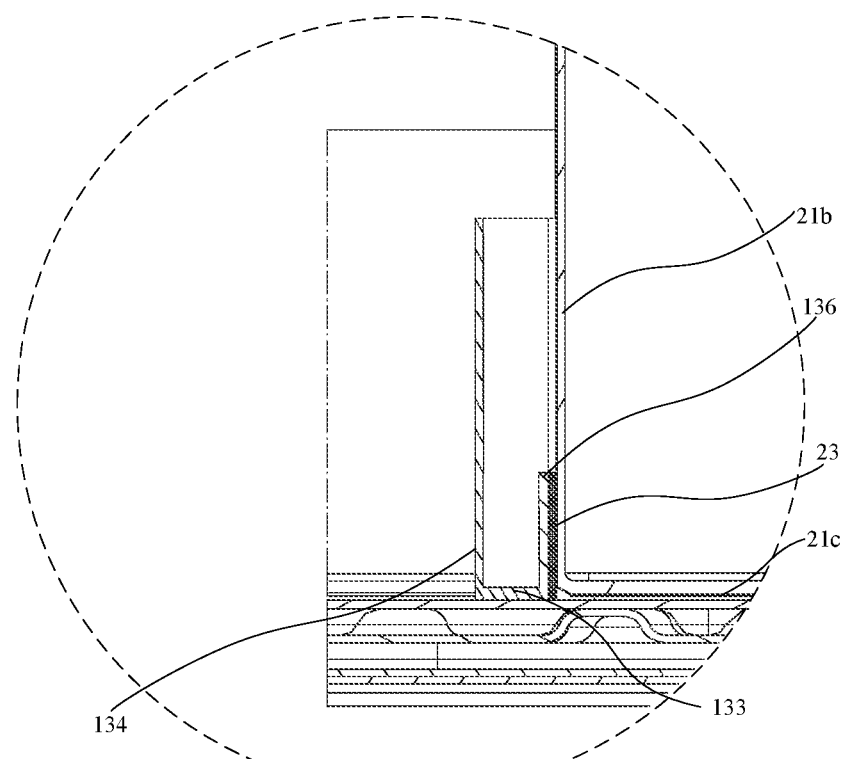
FIGS. 10-12 are cross-sectional views of a battery according to some embodiments of the present application.
Figure 11:
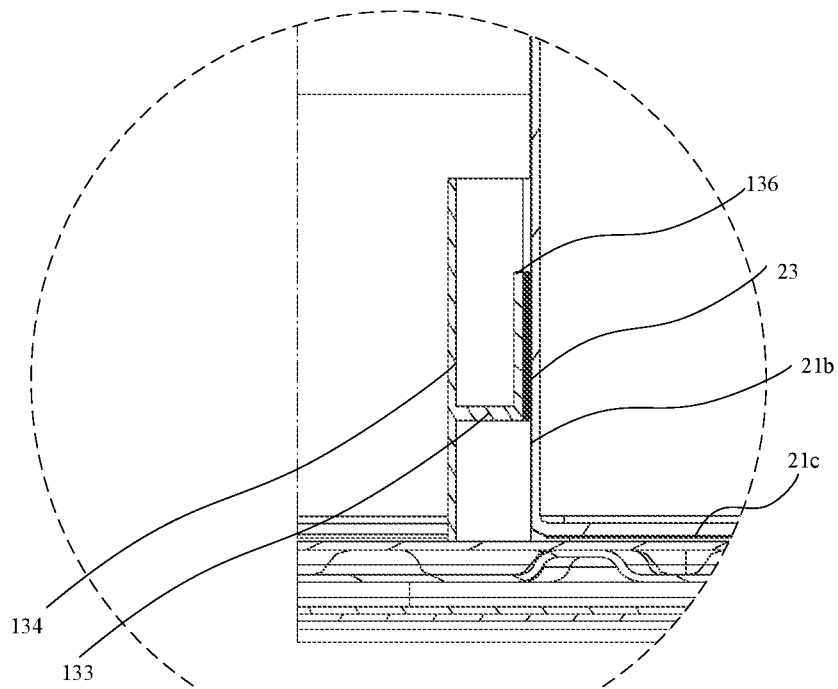

Alternatively, the first plate 133 may also be located between the first wall 21a and the third wall 21c, for example, as shown in FIGS. 7, 9 and 11.

At this time, in one embodiment of the present application, with reference to FIG. 11, one end of the second plate 134 close to the third wall 21c may lie in the same plane as the third wall 21c. Further, one end of each baffle of the at least two baffles 135 close to the third wall 21c may lie in the same plane as the third wall 21c, as shown in FIGS. 7 and 9. In this way, the first accommodating part 131 may be more firmly attached to the second wall 21b. Alternatively, in another embodiment of the present application, one end of the second plate 134 close to the third wall 21c may lie in the same plane as the first plate 133, and one end of each baffle of the at least two baffles 135 close to the third wall 21c may lie in the same plane as the first plate 133. At this time, the first accommodating part 131 is hanging in the air.

Figure 12:
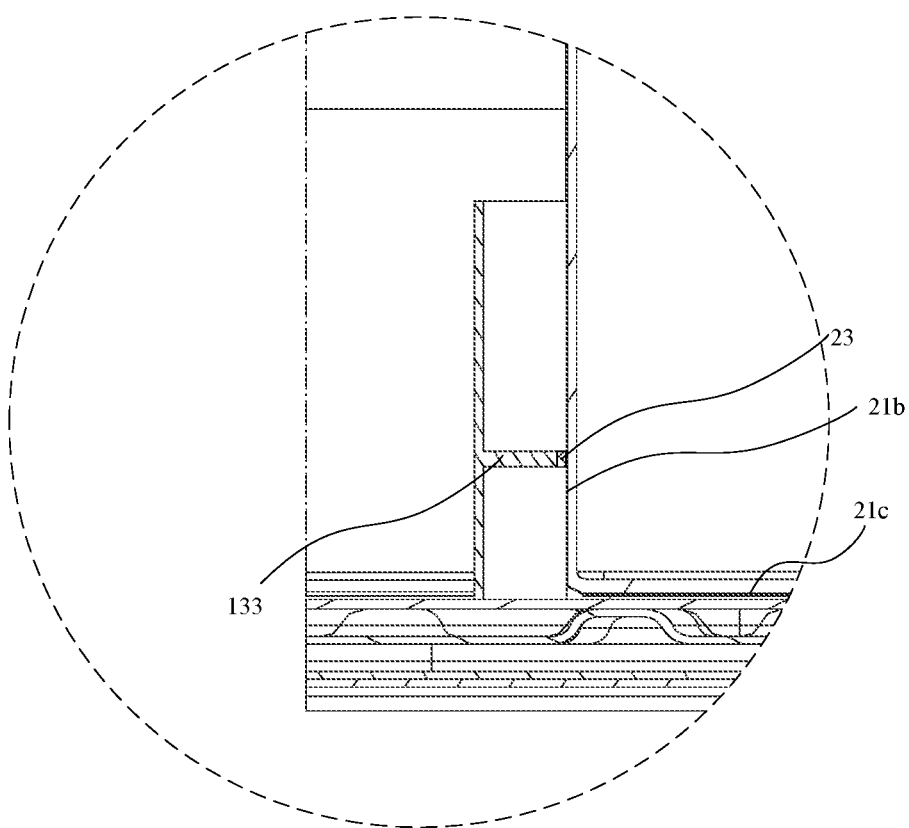

In the case where a first plate 133 intersects a second wall 21b, as shown in FIG. 12, the first plate 133 may be attached to the second wall 21b by a connecting member 23. The connecting member 23 may be, but is not limited to, a thermally conductive adhesive, and the thermally conductive adhesive may transfer heat to the battery cell 20.

Optionally, in an embodiment of the present application, with reference to FIGS. 10 and 11, the first accommodating part 131 may further include a connecting plate 136, and the connecting plate 136 may extend along a first direction at one end of the first plate 133 connected to the second wall 21b, and the connecting plate 136 may be attached to the second wall 21b by the connecting member 23, where the first direction is a direction perpendicular to the first wall 21a. In other words, one end of the first plate 133 connected to the second wall 21b may extend in the first direction to form the connecting plate 136, and the connecting plate 136 may be attached to the second wall 21b by the connecting member 23. As an example, the connecting plate 136 may have the shape shown in FIGS. 10 and 11, or the connecting plate 136 may have other shapes, such as an H shape, a U shape, etc.

By providing the connecting plate 136, a larger connecting area can be provided between the first accommodating part 131 and the second wall 21b, and thus the connection strength and heat conduction area can be increased.

The first plate 133 may also be attached to the second wall 21b by a sealing material or by means of welding. The sealing material may be a thermally conductive sealing material. It should be understood that the first plate 133 may also be attached to the second wall 21b in other manners, which is not limited in the embodiment of the present application. Similar to the attachment manner between the first plate 133 and the second wall 21b, the first plate 133, the second plate 134 and at least two baffles 135 may also be connected in the manner mentioned above.

Optionally, in an embodiment of the present application, other baffles 135b of the at least two baffles 135 may be embedded between two adjacent battery cells 20. In addition, other baffles 135b of the at least two baffles 135 may also be attached to two adjacent battery cells 20 by the connecting member. Other baffles 135b are embedded between two adjacent battery cells 20, which can improve the connection stability between the first accommodating part 131 and the second wall 21b.

In addition, two baffles 135a of the at least two baffles 135 may be attached to the second wall 21b by the connecting member or by means of welding.

Optionally, in an embodiment of the present application, the pressure relief mechanism 213 may be disposed on a first wall 21a of the battery cell, and the accommodating part 13 may further include a second accommodating part 132 disposed on the first wall 21a, and the pressure relief mechanism 213 is disposed on a bottom wall 132a of the second accommodating part 132, and the second accommodating part 132 is configured to collect the fire-fighting medium flowing into the battery cell 20 when the pressure relief mechanism 213 is actuated.

By providing the second accommodating part 132 on the first wall 21a of the battery cell 20, when thermal runaway occurs in the battery cell 20, the fire-fighting medium may not only flow into the battery cell 20, a part of the fire-fighting medium may also be stored in the second accommodating part 132, so that more fire-fighting media may be used for cooling and lowering the temperature of the battery cell 20. Further, when a flow rate of the fire-fighting medium is small, the fire-fighting medium may more easily be stored in the second accommodating part 132 and then flow into the battery cell 20, so as to cool and lower the temperature of the battery cell 20 where thermal runaway occurs.

The second accommodating part 132 may be defined as a recess.

With reference to FIG. 5, the first wall 21a may be the uppermost wall of the battery cell 20, and the second accommodating part 132 of the embodiment of the present application may be disposed on an upper surface of the battery cell 20.

Figure 13:
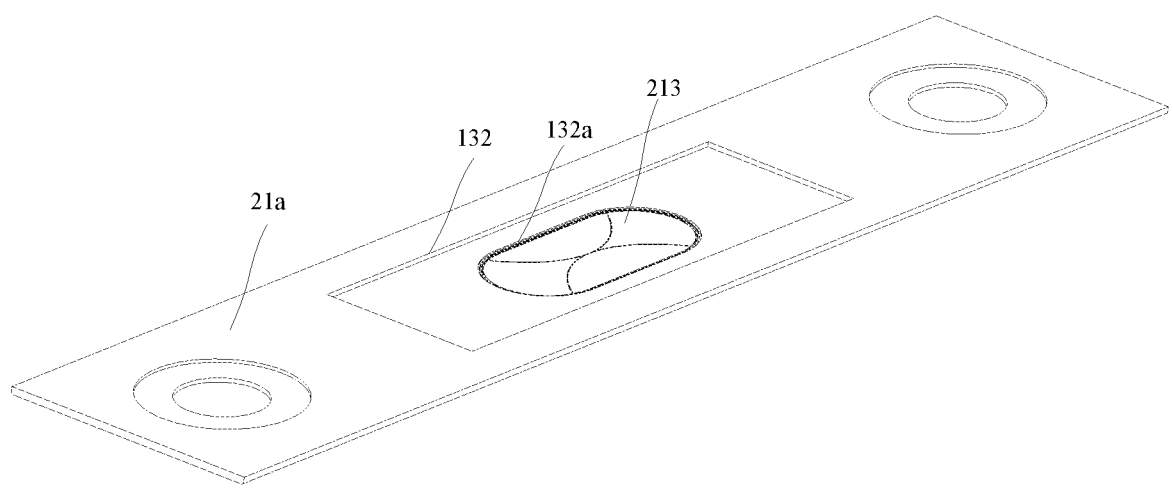
FIGS. 13 and 14 are vertical views of a battery according to some embodiments of the present application.
Figure 14:
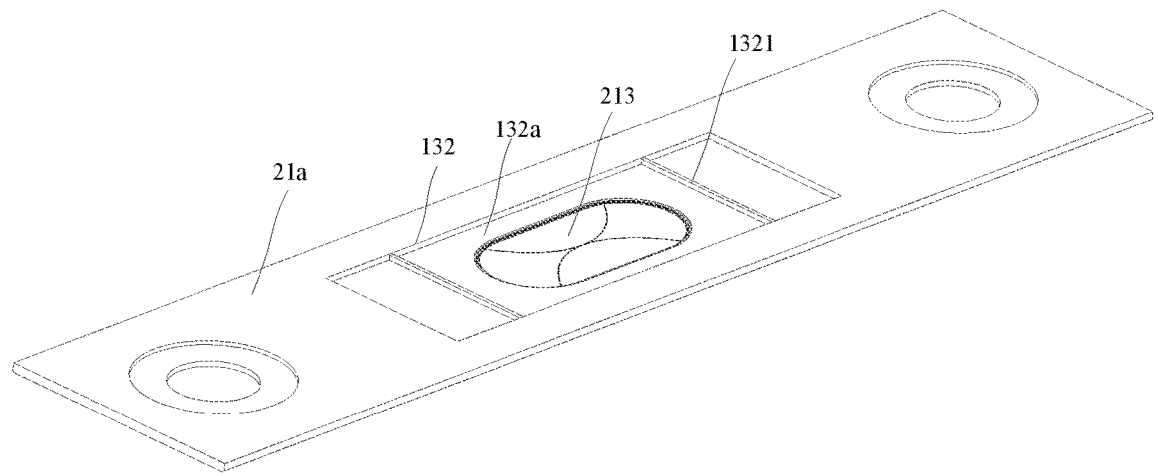

FIGS. 13 and 14 are vertical views of a battery 10 according to an embodiment of the present application. As shown in FIGS. 13 and 14, optionally, in an embodiment of the present application, an opening of the second accommodating part 132 faces toward an exterior of the battery cell 20, and an area of the opening of the second accommodating part 132 may be larger than an area of a region where the pressure relief mechanism 213 is located. The larger the area of the opening of the second accommodating part 132 is, the larger the area for the second accommodating part 132 to collect the fire-fighting medium is, thereby improving the efficiency of collecting the fire-fighting medium by the second accommodating part 132. It should be understood that the area of the opening of the second accommodating part 132 may also be smaller than or equal to the area of the region where the pressure relief mechanism 213 is located.

In addition, in order to allow the fire-fighting medium to better flow into the second accommodating part 132, in an embodiment of the present application, an area of an opening of the second accommodating part 132 may be larger than an area of a surface of the bottom wall 132a of the second accommodating part 132 toward an exterior of the battery cell 20. In other words, a side wall of the second accommodating part 132 gradually inclines downward from the periphery to the center, and the side wall of the second accommodating part 132 may be an inclined surface or a step shape. Of course, an area of an opening of the second accommodating part 132 may also be smaller than or equal to an area of a surface of the bottom wall 132a of the second accommodating part 132 toward an exterior of the battery cell 20.

In an embodiment of the present application, a thickness of the bottom wall 132a of the second accommodating part 132 may be uniform; or, a surface of the bottom wall 132a of the second accommodating part 132 toward an exterior of the battery cell 20 may be an inclined surface inclined toward an interior of the second accommodating part 132 from the periphery to the center. Simply stated, the thickness of the bottom wall 132a of the second accommodating part 132 may gradually increase from the center of the bottom wall 132a of the second accommodating part 132 to the periphery thereof. Alternatively, a surface of the bottom wall 132a of the second accommodating part 132 toward an exterior of the battery cell 20 is an inclined surface inclined toward an interior of the second accommodating part 132 from the center to the periphery.

Optionally, the bottom wall 132a of the second accommodating part 132 may also be provided with a through hole, and the pressure relief mechanism 213 covers the through hole. The pressure relief mechanism may completely cover the through hole or partially cover the through hole.

Further, in an embodiment of the present application, the second accommodating part 132 may include a plurality of regions, and the pressure relief mechanism 213 is located in one region among the plurality of regions. An area of each of the plurality of regions may be the same or different, which is not specifically limited in the embodiment of the present application. For example, as shown in FIG. 14, the second accommodating part 132 includes three regions, an area of a region where the pressure relief mechanism 213 is located is the largest, and the other two regions have the same area.

Considering that the second accommodating part 132 may be thin, in order to increase the strength of the second accommodating part 132, the bottom wall 132a of the second accommodating part 132 may be provided with a partition rib 1321, and the partition rib 1321 may divide the bottom wall 132a of the second accommodating part 132 into a plurality of regions. The embodiment of the present application does not specifically limit the number of the partition ribs 1321, for example, the number of the partition ribs 1321 in FIG. 14 is two. By providing the partition rib 1321, the strength of the second accommodating part 132 can be increased.

Figure 15:
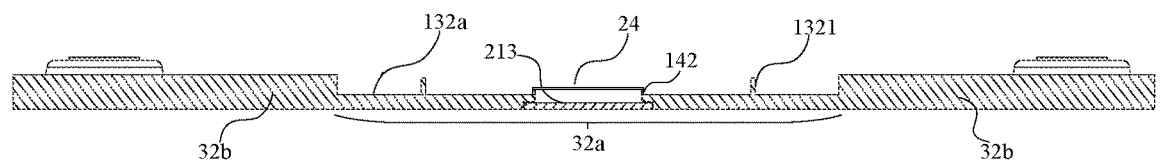
FIGS. 15 and 16 are cross-sectional views of a battery according to some embodiments of the present application.

Optionally, in an embodiment of the present application, a surface of the first wall 21a close to an interior of the battery cell 20 may include a first region 32a and a second region 32b, the first region 32a is a region corresponding to the second accommodating part 132, and the second region 32b is a region on the surface of the first wall 21a close to the interior of the battery cell 20 except the first region 32a. As an example, as shown in FIG. 15, the first region 32a and the second region 32b may lie in a same plane.

Figure 16:
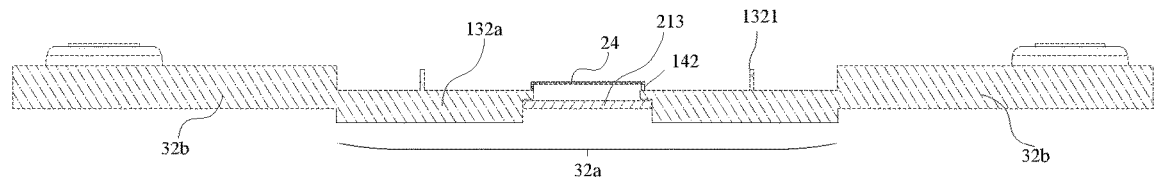

Alternatively, as shown in FIG. 16, the upper part of FIG. 16 corresponds to an exterior of the battery cell 20 and the lower part thereof corresponds to an interior of the battery cell 20, and a plane where the first region 32a is located may be closer to the interior of the battery cell 20 than a plane where the second region 32b is located. In this way, the fire-fighting medium may better flow into the second accommodating part 132.

Figure 17:
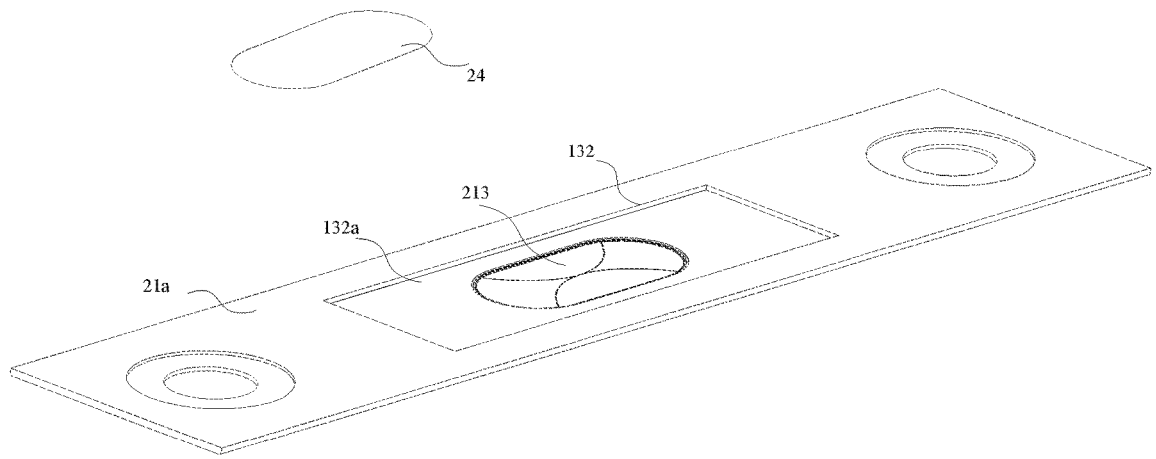
FIGS. 17 and 18 are schematic structural diagrams of a battery according to some embodiments of the present application.

In a production process of the battery cell 20, an electrolytic solution or other foreign matters often contaminates a surface of the pressure relief structure 213, and in a processing process of the battery cell 20, the pressure relief mechanism 213 may be contacted due to a misoperation, causing scratches left on the surface of the pressure relief mechanism 213 or the fracturing of the pressure relief region 213, which will affect the actuation effect of the pressure relief mechanism 213, and thus the safety of the battery cell 20 is affected. In order to improve the safety performance of the battery cell 20, optionally, in an embodiment of the present application, as shown in FIG. 17, the battery 10 may further include a protective sheet 24, and the protective sheet 24 is disposed on one side of the pressure relief mechanism 213 toward an exterior of the battery cell 20 and covers the pressure relief mechanism 213. A material of the protective sheet 24 may be, but is not limited to, polyethylene glycol terephthalate (PET), polypropylene (PP), polycarbonate (PC), etc.

By providing the protective sheet 24, foreign matters can be prevented from contacting the pressure relief mechanism 213, so that foreign matters will not affect the pressure when the pressure relief mechanism 213 is actuated, and thus the pressure relief mechanism 213 can be protected and the safety of the battery cell 20 can be improved.

Figure 18:
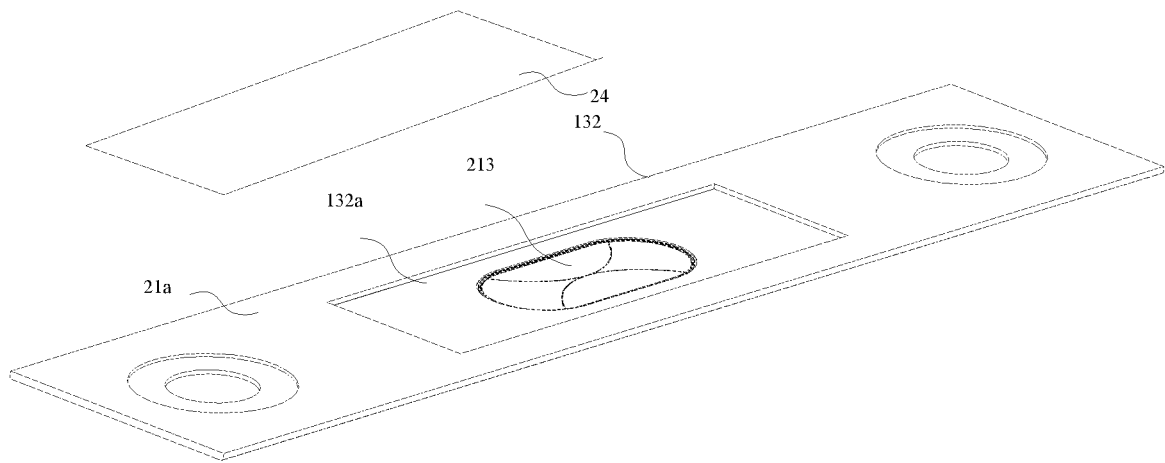

When the protective sheet 24 covers the pressure relief mechanism 213, the protective sheet 24 may also cover the second accommodating part 132. Illustratively, the protective sheet 24 may partially cover the opening of the second accommodating part 132, or may completely cover the opening of the second accommodating part 132 as shown in FIG. 18.

In order to increase the strength around the pressure relief mechanism 213, as shown in FIGS. 15 and 16, a surface of the bottom wall 132a of the second accommodating part 132 toward the exterior of the battery cell 20 may also be provided with a protrusion 142 extending toward the exterior of the battery cell 20 in a surrounding region of the pressure relief mechanism 213. In the case where the protrusion 142 is provided, the protective sheet 24 may be fixed on the protrusion 142 to cover the pressure relief mechanism 213.

Optionally, a height of the protrusion 142 protruding relative to the surface of the bottom wall 132a of the second accommodating part 132 toward the exterior of the battery cell 20 may be smaller than a depth of the second accommodating part 132.

In an embodiment of the present application, a power consumption device is further provided, and the power consumption device may include the battery 10 in each of the foregoing embodiments. Optionally, the power consumption device may be a vehicle 1, a ship or a spacecraft.

The battery and the power consumption device of the embodiment of the present application are described above, and a method and device for producing a battery of an embodiment of the present application will be described below. For the parts that are not described in detail, reference is made to the foregoing embodiments.

Figure 19:
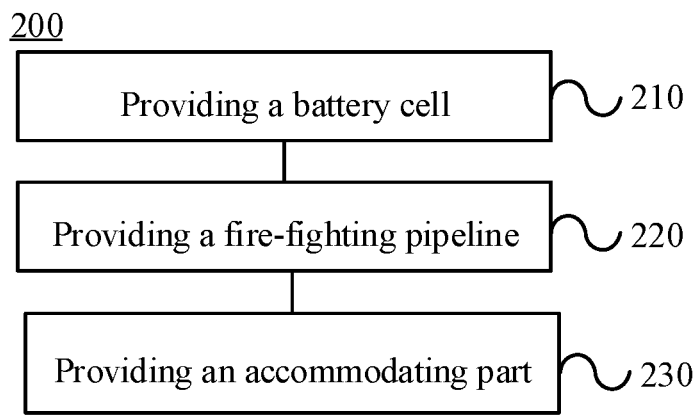
FIG. 19 is a schematic flowchart of a method for producing a battery according to an embodiment of the present application.

FIG. 19 shows a schematic flowchart of a method 200 for producing a battery according to an embodiment of the present application. As shown in FIG. 19, the method 200 may include:

210, providing a battery cell 20, the battery cell 20 including a pressure relief mechanism 213 configured to be actuated when an internal pressure or temperature of the battery cell 20 reaches a threshold, to relieve the internal pressure;

220, providing a fire-fighting pipeline 12, the fire-fighting pipeline 12 being configured to accommodate a fire-fighting medium and discharge the fire-fighting medium toward the battery cell 20 when the pressure relief mechanism 213 is actuated; and 230, providing an accommodating part 13, the accommodating part 13 being configured to accommodate the fire-fighting medium discharged from the fire-fighting pipeline 12 to lower a temperature of the battery cell 20.

Figure 20:
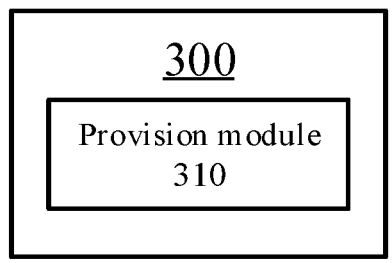
FIG. 20 is a schematic block diagram of a device for producing a battery according to an embodiment of the present application.

FIG. 20 is a schematic block diagram of a device 300 for producing a battery according to an embodiment of the present application. As shown in FIG. 20, the device 300 for producing a battery may include a provision module 310.

The provision module 310 may be configured to: provide a battery cell 20, the battery cell 20 including a pressure relief mechanism 213 configured to be actuated when an internal pressure or temperature of the battery cell 20 reaches a threshold, to relieve the internal pressure; provide a fire-fighting pipeline 12, the fire-fighting pipeline 12 being configured to accommodate a fire-fighting medium and discharge the fire-fighting medium toward the battery cell 20 when the pressure relief mechanism 213 is actuated; and provide an accommodating part 13, the accommodating part 13 being configured to accommodate the fire-fighting medium discharged from the fire-fighting pipeline 12 to lower a temperature of the battery cell 20.

Finally, it should be noted that the above embodiments are merely used for illustrating rather than limiting the technical solution of the present application; although the present application is illustrated in detail with reference to the foregoing embodiments, those of ordinary skill in the art should understand that it is still possible to make modifications to the technical solutions described in the foregoing embodiments or to make equivalent substitutions to some of the technical features thereof, but these modifications or substitutions do not make the nature of the respective technical solutions depart from the spirit and scope of the technical solutions of the embodiments of the present application.

What is claimed is:

1. A battery, comprising:
 a battery cell comprising a pressure relief mechanism configured to be actuated when an internal pressure or temperature of the battery cell reaches a threshold, to relieve the internal pressure;
 a fire-fighting pipeline configured to accommodate a fire-fighting medium and discharge the fire-fighting medium toward the battery cell when the pressure relief mechanism is actuated; and
 an accommodating part configured to accommodate the fire-fighting medium discharged from the fire-fighting pipeline to lower a temperature of the battery cell;
 wherein the pressure relief mechanism is disposed on a first wall of the battery cell, the accommodating part comprises a first accommodating part, the first accommodating part is attached to a second wall of the battery cell, the second wall is perpendicular to the first wall, and the first accommodating part is configured to collect the fire-fighting medium diffused from the first wall;
 wherein the first accommodating part comprises a first plate, a second plate and at least two baffles, the second plate intersects the first plate, the first plate intersects the second wall, and the at least two baffles intersect the first plate and the second plate;
 wherein other baffles of the at least two baffles except two baffles located at both ends of the second plate are embedded between two adjacent battery cells.

2. The battery according to claim 1, wherein the first plate is parallel to the first wall, the second plate is parallel to the second wall, and the at least two baffles are perpendicular to the first plate and the second plate.

3. The battery according to claim 2, wherein the first plate is a bottom plate of a case of the battery, and the second plate is a side plate of a case of the battery or a beam of a case.

4. The battery according to claim 1, wherein two baffles of the at least two baffles, the first plate, the second plate, and the second wall(s) of N battery cell(s) are configured to form an accommodating space for accommodating the fire-fighting medium, and the accommodating space has an opening toward the first wall, and N is a positive integer.

5. The battery according to claim 1, wherein the at least two baffles have a same length in a first direction, and the first direction is a direction perpendicular to the first wall.

6. The battery according to claim 1, wherein the first plate and a third wall of the battery cell lie in a same plane, and the third wall is parallel to the first wall, or the first plate is located between the first wall and a third wall of the battery cell, and the third wall is parallel to the first wall.

7. The battery according to claim 6, wherein one end of the second plate close to the third wall is flush with the third wall.

8. The battery according to claim 1, wherein the first plate is attached to the second wall by a connecting member.

9. The battery according to claim 8, wherein the first accommodating part comprises a connecting plate, the connecting plate extends along a first direction at one end of the first plate connected to the second wall, and the connecting plate is attached to the second wall by the connecting member, and the first direction is a direction perpendicular to the first wall.

10. The battery according to claim 1, wherein the pressure relief mechanism is disposed on a first wall of the battery cell, the accommodating part comprises a second accommodating part disposed on the first wall, the pressure relief mechanism is disposed on a bottom wall of the second accommodating part, and the second accommodating part is configured to collect the fire-fighting medium flowing into the battery cell when the pressure relief mechanism is actuated.

11. The battery according to claim 10, wherein an opening of the second accommodating part faces toward an exterior of the battery cell, and an area of the opening of the second accommodating part is larger than an area of a region where the pressure relief mechanism is located.

12. The battery according to claim 10, wherein an area of an opening of the second accommodating part is larger than or equal to an area of a surface of the bottom wall of the second accommodating part toward an exterior of the battery cell.

13. The battery according to claim 10, wherein a thickness of the bottom wall of the second accommodating part is uniform, or a surface of the bottom wall of the second accommodating part toward an exterior of the battery cell is an inclined surface inclined toward an interior of the second accommodating part from the periphery to the center.

14. The battery according to claim 10, wherein a surface of the first wall close to an interior of the battery cell comprises a first region and a second region, the first region is a region corresponding to the second accommodating part, the second region is a region on the surface of the first wall close to the interior of the battery cell except the first region, and the first region and the second region lie in a same plane, or a plane where the first region is located is closer to the interior of the battery cell than a plane where the second region is located.

15. The battery according to claim 10, wherein the bottom wall of the second accommodating part is provided with a partition rib, and the partition rib divides the bottom wall of the second accommodating part into at least two regions, and the pressure relief mechanism is located in one region of the at least two regions.

16. A power consumption device, comprising a battery, the battery comprising:
 a battery cell comprising a pressure relief mechanism configured to be actuated when an internal pressure or temperature of the battery cell reaches a threshold, to relieve the internal pressure;
 a fire-fighting pipeline configured to accommodate a fire-fighting medium and discharge the fire-fighting medium toward the battery cell when the pressure relief mechanism is actuated; and
 an accommodating part configured to accommodate the fire-fighting medium discharged from the fire-fighting pipeline to lower a temperature of the battery cell;
 wherein the pressure relief mechanism is disposed on a first wall of the battery cell, the accommodating part comprises a first accommodating part, the first accommodating part is attached to a second wall of the battery cell, the second wall is perpendicular to the first wall, and the first accommodating part is configured to collect the fire-fighting medium diffused from the first wall;
 wherein the first accommodating part comprises a first plate, a second plate and at least two baffles, the second plate intersects the first plate, the first plate intersects the second wall, and the at least two baffles intersect the first plate and the second plate;
 wherein other baffles of the at least two baffles except two baffles located at both ends of the second plate are embedded between two adjacent battery cells.

17. A method for producing a battery, comprising:
 providing a battery cell, the battery cell comprising a pressure relief mechanism configured to be actuated when an internal pressure or temperature of the battery cell reaches a threshold, to relieve the internal pressure;
 providing a fire-fighting pipeline, the fire-fighting pipeline being configured to accommodate a fire-fighting medium and discharge the fire-fighting medium toward the battery cell when the pressure relief mechanism is actuated; and
 providing an accommodating part, the accommodating part being configured to accommodate the fire-fighting medium discharged from the fire-fighting pipeline to lower a temperature of the battery cell;
 wherein the pressure relief mechanism is disposed on a first wall of the battery cell, the accommodating part comprises a first accommodating part, the first accommodating part is attached to a second wall of the battery cell, the second wall is perpendicular to the first wall, and the first accommodating part is configured to collect the fire-fighting medium diffused from the first wall;
 wherein the first accommodating part comprises a first plate, a second plate and at least two baffles, the second plate intersects the first plate, the first plate intersects the second wall, and the at least two baffles intersect the first plate and the second plate;
 wherein other baffles of the at least two baffles except two baffles located at both ends of the second plate are embedded between two adjacent battery cells.

\* \* \* \* \*